Patented Apr. 13, 1954

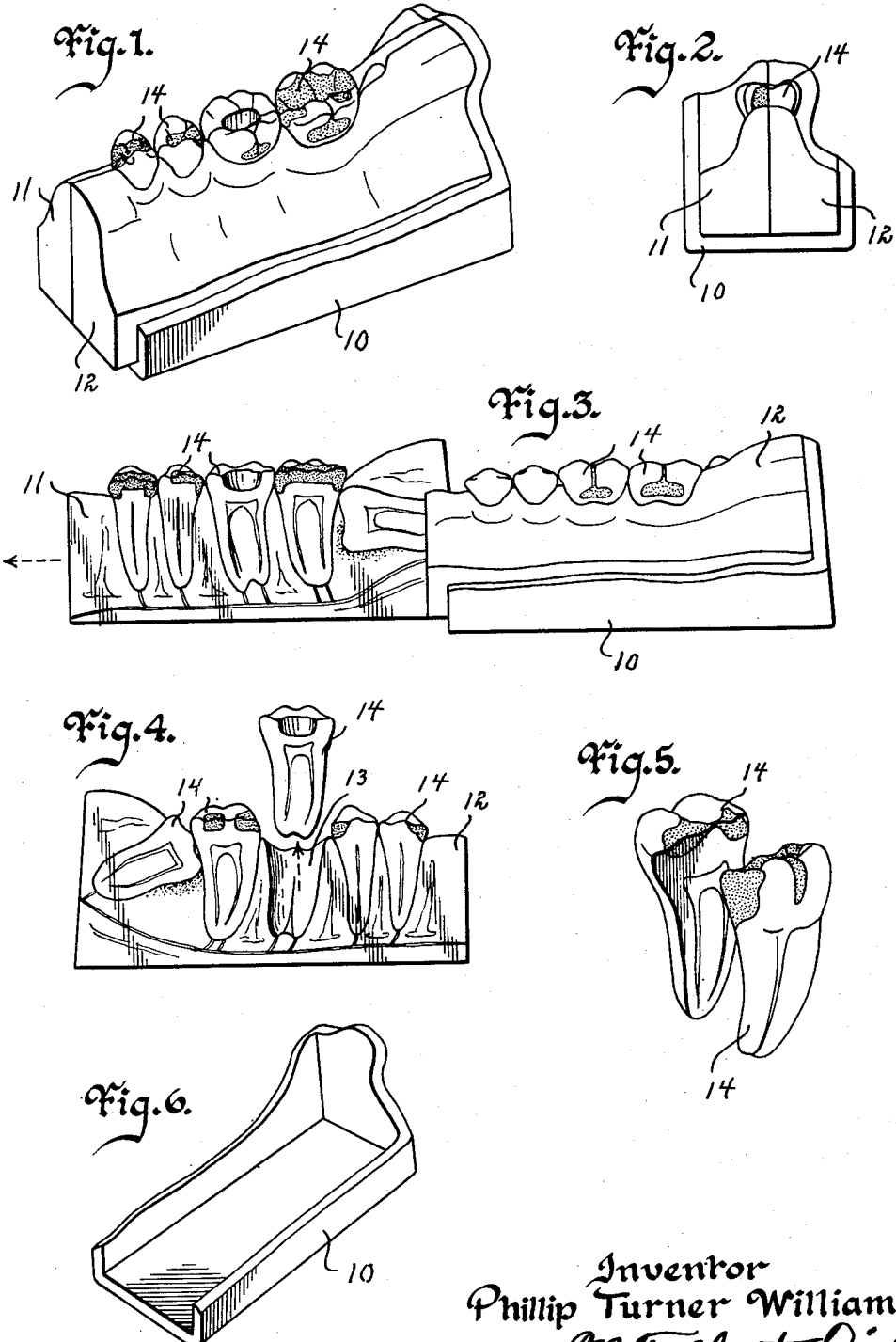

2,674,802

UNITED STATES PATENT OFFICE 2,674,802

ILLUSTRATIVE EQUIPMENT FOR USE IN DENTISTRY

Phillip Turner Williams, Anita, Iowa

Application May 4, 1953, Serial No. 352,764

6 Claims. (Cl. 32—71)

This invention relates to dentistry and more particularly to equipment for illustrating the condition and status of gums and teeth before and after work has been done on the same.

While my illustrative equipment may well be used for instruction purposes among dentists, it is chiefly designed to inform the patient of the present condition of his or her teeth, their relation to the mouth and gum, what dental work is necessary, and how the teeth or tooth will look after repair or replacement. There has long been a need for such equipment inasmuch as the average patient never realizes the seriousness nor gravity of the problem confronting the dentist. Furthermore, knowing the facts and with the doctor pointing out exactly what is going to be done, gives confidence to the patient as well as a clear understanding of what the results are likely to be. While most dentists do have pictures or possibly teeth to use as illustrations, such are not capable of complete and universal merit in advising the patient exactly his own condition, the technique of work to be done, nor how the finished work will look.

Therefore, the principal object of my invention is to provide a demonstrative jaw section that embraces selective teeth capable of reconstructing almost any mouth condition either as to its present or future status.

A further object is to provide such dental equipment that permits the easy viewing of teeth sections.

A still further object of this invention is to provide such dental equipment that is consolidated in a unit package.

A still further object is to provide an illustrative dental device that is refined in appearance and durable in use.

These and other objects will be apparent to those skilled in the art.

My invention consists in the construction, arrangement and combination of the various parts of the device, whereby the objects contemplated are attained as hereinafter more fully set forth, and specifically pointed out in my claims, and illustrated in the accompanying drawings, in which:

Fig. 1 is a perspective view of my device in an assembled condition,

Fig. 2 is an end view of my assembled illustrative dental device,

Fig. 3 is a side view of the invention with one portion slid longitudinally outwardly from its normal position to illustrate the sectional teeth, Fig. 4 is an inside view of one-half of the gum or jaw portion and illustrates the selective removal or replacement of the sectional teeth, Fig. 5 is a perspective view of a tooth and illustrates the fact that the teeth are longitudinally cut into two pieces to show their internal structure and condition, and Fig. 6 is a perspective view of the trough keeper that holds all of the various parts of the device in proper but removable assembly.

Referring to the drawings in detail, the numeral 10 designates the trough container open at its forward end. This tray keeper has a bottom, the two side walls and a back end as shown in Fig. 6. The numerals 11 and 12 designate the two portions that make up a gum section. While in the drawings I show the gum to be only an elongated side section of the jaw and gum, obviously the entire jaw or gum could be used, and sectioned as desired. In the drawings this gum and jaw section is split longitudinally and vertically on substantially a center line, thus forming the two pieces 11 and 12. In the center line of the jaw and gum portion, are teeth sockets 13 for the reception of illustrative teeth. Inasmuch as the gum is longitudinally split one-half of a socket will be formed in one of the pieces 11 and the other half of the socket will be formed in the piece 12, with the two half sockets registering with each other.

In like manner a tooth 14 will be longitudinally cut in two pieces so that one-half of the tooth will reside in the one-half socket in the gum 11 and the other matching but independent half of tooth will reside in the other half of the socket found in the gum 12. Thus the cut line of the teeth will be common with the cut line of the gum. As the teeth are each removable from a socket, either in whole or in halves, any teeth desired may be installed. The tooth may illustrate a perfect one, or one of any structure, damage, or repair. In the drawings I have shown only a few examples that may be employed. The same can show rotted sections, diseased or dead nerve, broken enamel, gold inlays, silver fillings, occlusions, and like. In the drawings I even show an impacted molar. By the teeth being split with the gum, one can observe the internal status of a given tooth. With my device two or more teeth may be removed and a bridge structure installed to illustrate this particular tooth repair. The selection of illustrative teeth to use in my device is varied and substantially unlimited.

Regardless of the selective assembly, however, the key to my invention is the successful holding of all the pieces together, yet permitting their observation. As far as the inspection is concerned, this is made possible by splitting the gum and teeth on a common line, and by the teeth being readily removable. However, for successfully holding all the parts together, I have provided the tray keeper 10. Obviously the two sides of the tray engage the two sides of the gum and jaw portions and its bottom supports the same, thereby holding the two sections 11 and 12 together. With the two jaw sections held together, the split teeth will likewise be held together. Without the tray, therefore, all of the various pieces would fall apart. This does not mean that the various pieces cannot be removed, replaced, or moved. Reference has already been made to the removal and selective replacement of the teeth. By careful manipulation one jaw section may be slid outwardly a distance from its mate to show a large longitudinal section of the same, and the split teeth found in that section as shown in Fig. 3. By sliding the section back into the tray keeper, the half teeth will not be disturbed. Another method is to move one jaw section upwardly in its vertical sliding movement to expose at least the upper inside portions of the half teeth.

From the foregoing it will be seen that I have provided a dental device that lends itself for both instruction, illustration, and explanation.

Some changes may be made in the construction and arrangement of my illustrative equipment for use in dentistry without departing from the real spirit and purpose of my invention, and it is my intention to cover by my claims, any modified forms of structure or use of mechanical equivalents which may be reasonably included within their scope.

I claim:

1. In a dental device, an illustrative gum portion, an illustrative tooth in said gum portion, with said gum portion and said tooth split on a common plane, and a tray member embracing and detachably holding the two split portions of said gum portion together.

2. In a dental device, an illustrative gum portion, an illustrative tooth in said gum portion, with said gum portion and said tooth split on a common vertical plane, and a tray member embracing and detachably holding the two split portions of said gum portion together.

3. In a dental device, an illustrative gum portion, an illustrative tooth in said gum portion with said gum portion and said tooth split on a common vertical longitudinal plane, and a tray member embracing and detachably holding the two split portions of said gum portion together.

4. In a device of the class described, an illustrative gum portion having a plurality of sockets, illustrative teeth detachably resting in said sockets, respectively; said gum portion and said teeth cut in two and in a common vertical plane, and a means for holding the resultant two gum parts together.

5. In a device of the class described, an illustrative gum portion having a plurality of sockets, illustrative teeth detachably resting in said sockets, respectively; said gum portion and said teeth cut in two and in a common vertical plane, and a means for slidably holding the resultant two gum parts together.

6. In a device of the class described, an illustrative gum portion having a plurality of sockets, illustrative teeth detachably resting in said sockets, respectively; said gum portion and said teeth cut in two and in a common vertical plane, and a means for slidably detachably holding the resultant two gum parts together.

References Cited in the file of this patent

UNITED STATES PATENTS

| Number | Name | Date |
| --- | --- | --- |
| 1,048,382 | Allen | Dec. 24, 1912 |
| 2,256,667 | Doret | Sept. 23, 1941 |